3,522,866
BRAKE ELEMENT AND RETAINING MEANS
THEREFOR
Bernd Marie Adolf Habersack, Duez, Germany, assignor to Girling Limited, Birmingham, England
Filed Dec. 2, 1968, Ser. No. 780,540
Claims priority, application Great Britain, Dec. 1, 1967, 54,802/67
Int. Cl. F16d 65/02
U.S. Cl. 188—73.6  12 Claims

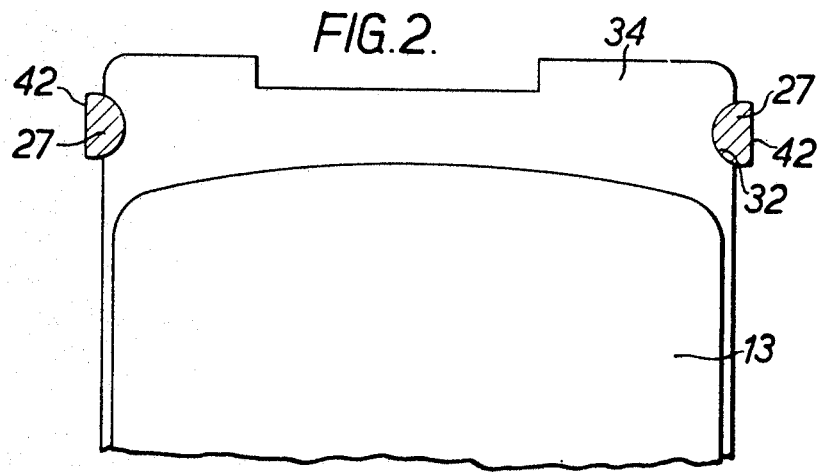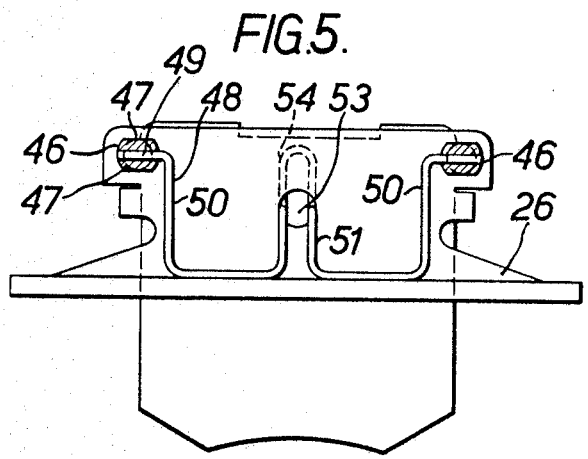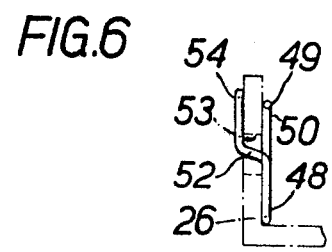

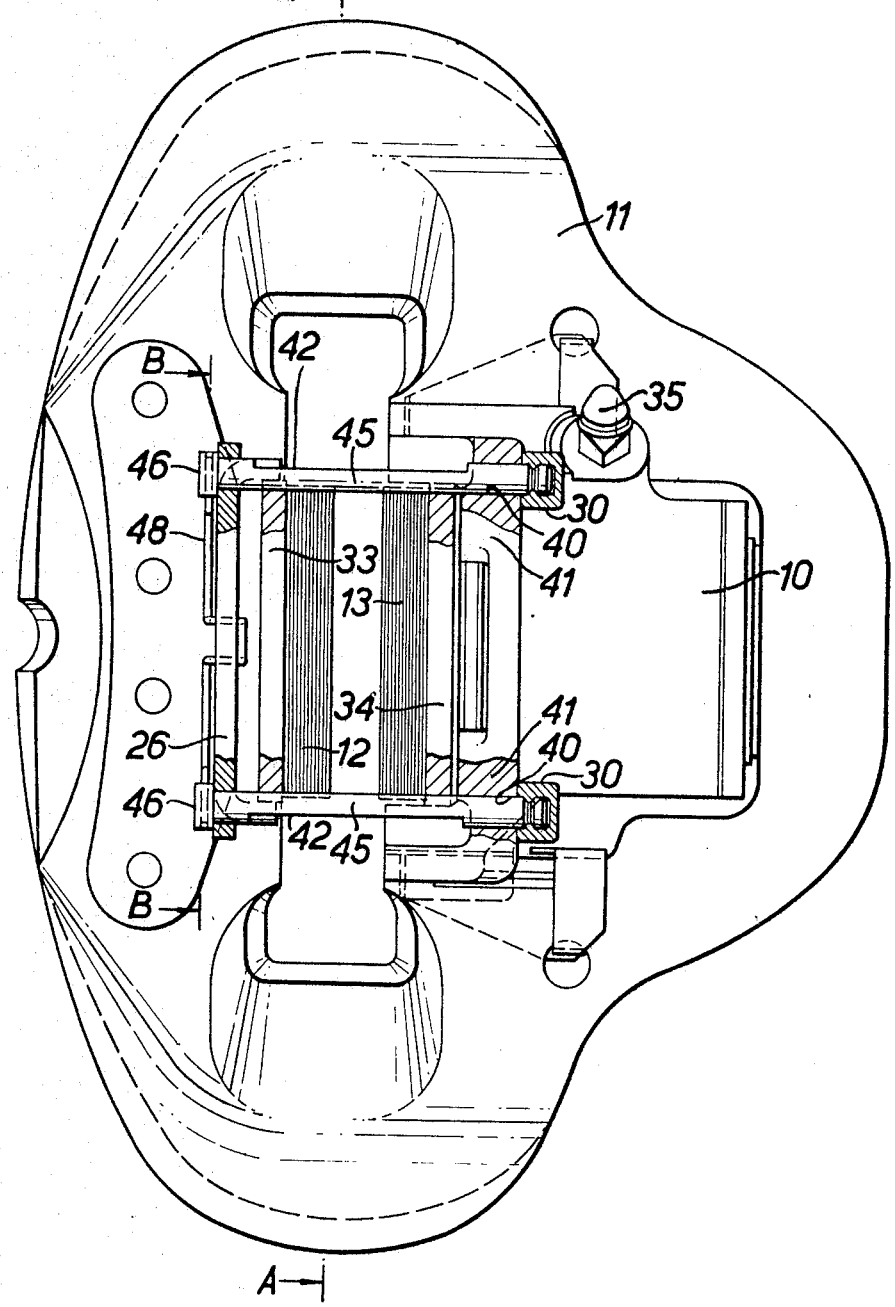

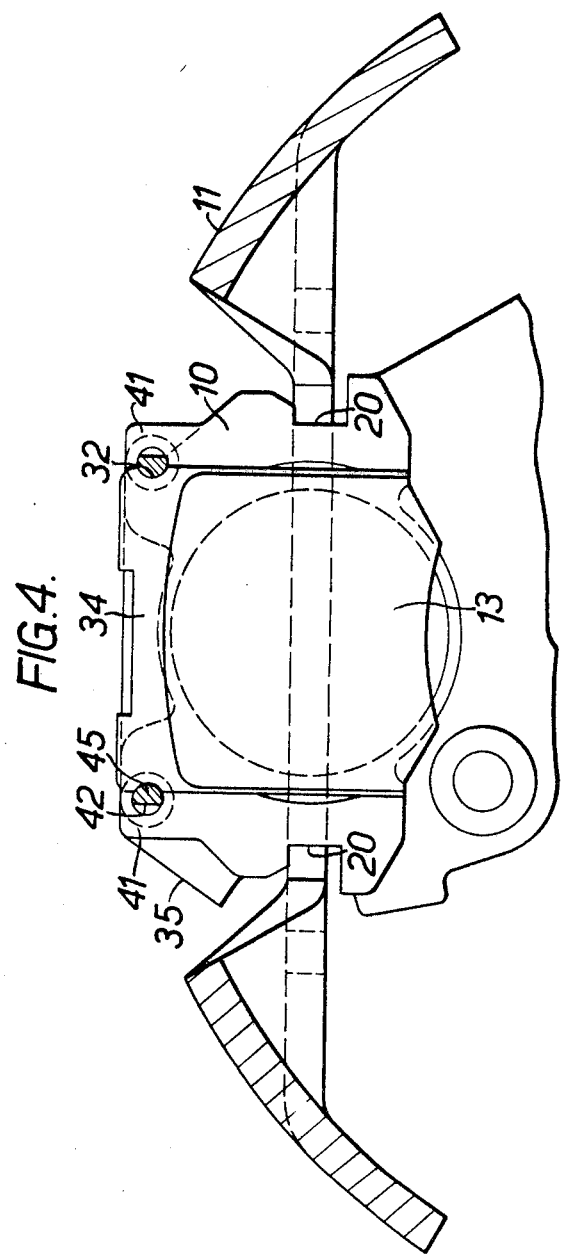

ABSTRACT OF THE DISCLOSURE

The invention provides a spot-type disc brake in which a pair of opposed brake pads are radially retained by a pair of pins which engage in notches in opposite side edges of the backplates of the pads. The pins have flats so that, by turning the pins until the flats face one another, the pads can be withdrawn for replacement. Releasable means are provided to prevent inadvertent rotation of the pins.

The present invention relates to a spot type disc brake provided with actuator means operative to apply a pair of opposed brake pads to opposite faces of a disc.

According to the present invention, the brake pads are radially located whilst permitting movement towards and away from one another, by a pair of rotatable pins which engage in notches in opposite side edges of back plates of the pads, the pins having flats so that, by turning the pins through a suitable angle, the pads can be radially withdrawn for replacement.

Various means are possible for preventing inadvertent rotation of the pins. For example the pins may have cranked ends, releasable means being provided for securing these cranked ends to one another in the pad retaining positions of the pins. Alternatively releasable means, such as spring means, may engage heads on the pins to prevent the pins from turning.

The invention is further described, by way of example, with reference to the accompanying drawings, in which:

FIG. 2 is an enlarged view of part of one of the pads of the brake of FIG. 1;

FIG. 3 is a view, similar to FIG. 1, but showing a second embodiment of disc brake;

FIG. 4 is a section on the line A—A of FIG. 3;

FIG. 5 is a section on the line B—B of FIG. 3, and

FIG. 6 is a side elevation of the spring shown in FIG. 5.

Figure 1:
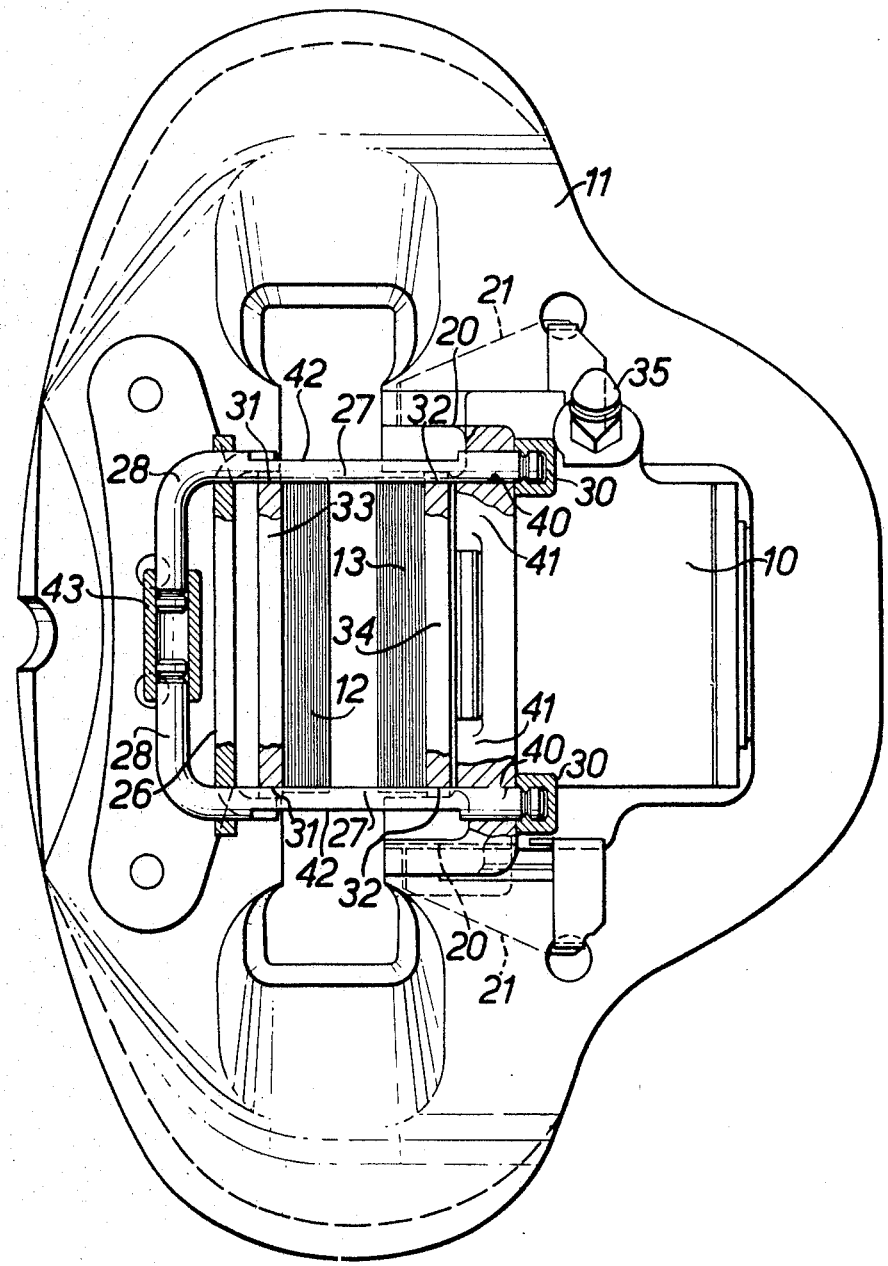
FIG. 1 is a plan view, partly sectioned, of a spot type disc brake constructed in accordance with one embodiment of the invention.

Referring to FIG. 1 of the drawings, a spot type disc brake comprises a body member 10, a yoke 11 adapted to support an indirectly operated pad 12 and a hydraulic actuator formed within the body member 10 and operative between the yoke 11 and a directly operated pad 13. The hydraulic actuator comprises a pair of opposed pistons (not shown) slidable within a cylinder constituted by a through bore in the body member 10.

The body member 10 has integral mounting lugs (not shown) adapted to be bolted to a torque plate or other fixed part of the wheel mounting (not shown) adjacent a disc (also not shown) so that the disc periphery extends between the pads 12, 13. The body member 10 has a pair of longitudinal grooves 20 formed at opposite sides thereof, in which grooves the inside edges of the yoke 11 are guided with clearance. A spring 21 acts between one wall of each groove 20 and the yoke to urge the yoke against the other walls of the grooves 20 to avoid spragging. One of the actuator pistons acts on the pad 13 whilst the other acts on the yoke 11 which is also located in said other piston by an inwardly extending tongue (not shown) formed integrally with the yoke and supported in a blind bore in said other piston.

A bracket 26 is secured to the yoke 11 adjacent the pad 12 and supports a pair of pad-retaining pins 27 whose other ends are slidably received in bores 40 through lugs 41 on the body member 10. The pins 27 have cranked ends 28 to prevent the pins passing right through the bracket 26 and snap-on end caps 30 hold the pins 27 captive on the lugs 41. Backing plates 33 and 34 respectively on the pads 12 and 13 have notches 31 and 32 through which pass the pins 27 whereby the pads 12 and 13 are radially located in their appropriate positions. An inlet or bleeder opening 35, communicating with the hydraulic cylinder is provided at the top of the body member 10.

The pad locating pins 27 are generally circular in section but they are formed with flats 42 which face outwards in the normal positions of the pins illustrated in FIG. 1 and also in FIG. 2. The pins are prevented from turning by a sleeve 43 of plastics material or the like in which the cranked ends 28 of the pins are releasably received. When it is desired to remove the brake pads, for example for replacement, the sleeve 43 is pushed further onto one of the crank ends 28 and thereby released from the other cranked ends. The pins 27 can then be easily turned through 180° so that the flats 42 face inwardly. The width of the back plates 33 and 34 of the pads is just slightly less than the distance between the flats 42 when the pins are so turned whereby the pads can be removed in a radial direction and replaced. Thus the cross-section of the notches 31 and 32 in the pad back plate is somewhat less than semi-circular and corresponds to the depth of the flats 42. New pads can now be inserted in position and the pins 27 turned back to their positions illustrated in which they are retained by sliding the sleeve 43 back in position as shown over both of the cranked ends 28. As the pins are turned they engage into the notches 31 and 32 of the new pads to radially locate them in position.

The flexible sleeve 43 illustrated can be replaced by any similar flexible means such as a coil spring.

The brake shown in FIGS. 3 and 4 of the drawings is generally similar to that of FIG. 1 and like parts are denoted by like reference numerals where relevant. The embodiment of FIGS. 3 and 4 differs from that of FIG. 1 in that the pad locating pins 45 are provided with heads 46 instead of cranked ends. The heads 46 of the pins 45 have opposed flats 47 as shown in FIG. 5, in which figure the yoke 11 and the body member 10 have been omitted. Thus a spanner can be used for turning the pins 45 through 180° to release the pads 12 and 13 and enable the pads to be replaced as previously described with reference to FIGS. 1 and 2 of the drawings.

A wire spring 48 serves for preventing the pins 45 from turning inadvertently. The wire spring 48 is of W shape. The spring 48 has out-turned ends 49 which releasably engage in diametral bores in the heads 46 of the pins 45. The outer legs 50 of the spring 48 lie at one side of the bracket 26 as shown in FIG. 6 wherein the bracket is illustrated in chain dotted lines. The central leg 51 of the spring 48 has a double-cranked portion 52 which passes through a central aperture 53 in the bracket 26 so that the upper end 54 of the central leg lies on the opposite side of the bracket 26 to retain the spring in place as can be seen from FIG. 6. To enable the pins 45 to be rotated to permit pad replacement, the out-turned ends 49 of the spring 48 can be sprung out of the diametral bores in the heads 46.

An advantage of the above described embodiments is that the pins themselves are not removable from the brake when a pad change is required and in fact no parts are removable in such circumstances except the pads themselves. Thus the possibility of parts becoming lost when a pad change is being performed is substantially averted.

I claim:

1. A spot type disc brake comprising a disc, a body member, a pair of brake pads each having a backplate, means mounting said brake pads on said body member for axial movement into engagement with opposite faces of the disc, and actuator means for urging said pads against said disc, said mounting means including a pair of notches in opposite radially extending side edges of each of said pad backplates and a pair of axially directed pins received in said body member and each engaging in one of said notches in both backplates to radially retain said pads in position, said pins being rotatable and having flats such that when the pins are turned from their pad-retaining positions to bring such flats face to face, the dimension between said flats is not less than the dimension between said radially extending side edges.

2. A spot-type disc brake according to claim 1 further comprising means for preventing inadvertent rotation of the pins.

3. A spot-type disc brake according to claim 1 in which said pins have cranked ends and further comprising releasable means connecting said cranked ends together to prevent inadvertent rotation of said pins from their pad-retaining positions.

4. A spot-type disc brake according to claim 3 in which said releasable means comprises flexible sleeve means pushed on to said cranked ends.

5. A spot-type disc brake according to claim 4 in which said flexible sleeve means comprises a tube of plastics material.

6. A spot-type disc brake according to claim 4 in which said flexible sleeve means comprises a close-coiled helical spring.

7. A spot-type disc brake according to claim 2 in which said rotation preventing means comprises spring means releasably engaging head-ends of said pins.

8. A spot-type disc brake according to claim 7 in which said spring means comprises a captive spring.

9. A spot-type disc brake according to claim 1 in which said brake pad mounting means includes longitudinal grooves in opposite side edges of said body member and a yoke slidably received in said grooves and operatively engaging one of said brake pads, said actuating means being operative between said yoke and the other of said brake pads.

10. A spot-type disc brake according to claim 9 including bracket means on said yoke, said pins being received in said bracket means as well as in said body member.

11. A spot-type disc brake according to claim 9 in which said actuator is contained within said body member.

12. A spot-type disc brake according to claim 9 in which said actuator comprises a through bore in said body member and a pair of opposed pistons slidable in said through bore.

References Cited

UNITED STATES PATENTS 3,255,848   6/1966   Harrison _____ 188—73

FOREIGN PATENTS 875,158   8/1961   Great Britain.
935,994   9/1963   Great Britain.

GEORGE E. A. HALVOSA, Primary Examiner